(12) United States Patent
Bauer et al.

(10) Patent No.: US 10,598,244 B2
(45) Date of Patent: Mar. 24, 2020

(54) SWITCHABLE DAMPER

(71) Applicant: SUSPA GmbH, Altdorf (DE)

(72) Inventors: Michael Bauer, Freihung (DE); Andreas Pelczer, Altdorf (DE); Roland Ernstberger, Hirschau (DE); Michael Weder, Nürnberg (DE)

(73) Assignee: SUSPA GMBH, Altdorf (DE)

( * ) Notice: Subject to any disclaimer, the term of this patent is extended or adjusted under 35 U.S.C. 154(b) by 192 days.

(21) Appl. No.: 15/585,346

(22) Filed: May 3, 2017

(65) Prior Publication Data
US 2017/0321776 A1 Nov. 9, 2017

(30) Foreign Application Priority Data
May 4, 2016 (DE) .......... 10 2016 207 809

(51) Int. Cl.
F16F 7/09 (2006.01)
F16F 7/08 (2006.01)
D06F 37/20 (2006.01)
D06F 37/22 (2006.01)

(52) U.S. Cl.
CPC ............... F16F 7/082 (2013.01); F16F 7/09 (2013.01); D06F 37/20 (2013.01); D06F 37/22 (2013.01); F16F 2222/04 (2013.01); F16F 2230/0041 (2013.01); F16F 2232/08 (2013.01)

(58) Field of Classification Search
CPC ...... F16F 7/08; F16F 7/082; F16F 7/09; F16F 2222/04; F16F 9/56; F16F 2230/0041; D06F 49/06; D06F 37/20
See application file for complete search history.

(56) References Cited

U.S. PATENT DOCUMENTS

| 5,720,369 A | 2/1998 | Thorn | |
| 6,264,014 B1* | 7/2001 | Ferlicca | D06F 37/20 188/129 |
| 2006/0011429 A1 | 1/2006 | Park et al. | |
| 2006/0054440 A1* | 3/2006 | Peuker | D06F 37/20 188/381 |
| 2007/0039792 A1* | 2/2007 | Peuker | D06F 37/20 188/322.16 |
| 2014/0026623 A1* | 1/2014 | Kim | D06F 37/20 68/140 |
| 2014/0090939 A1* | 4/2014 | Kanioz | F16F 7/09 188/271 |
| 2016/0208881 A1* | 7/2016 | Kanioz | F16F 7/09 |
| 2017/0292215 A1* | 10/2017 | Na | F16F 7/09 |

FOREIGN PATENT DOCUMENTS

| DE | 198 06 500 A1 | 8/1999 |
| DE | 696 13 223 T2 | 5/2002 |
| DE | 10 2008 038 133 A1 | 2/2010 |
| EP | 1 637 640 B1 | 3/2008 |
| EP | 2 692 931 A1 | 2/2014 |
| KR | 2013 0037952 A | 4/2013 |

* cited by examiner

Primary Examiner — Nicholas J Lane
(74) Attorney, Agent, or Firm — McGlew and Tuttle, P.C.

(57) ABSTRACT

A switchable damper comprises a housing having a longitudinal axis, a plunger displaceable along the longitudinal axis, a piston arranged between the housing and the plunger, a friction lining arranged on the piston and a switching unit, which is switchable between a blocking arrangement, in which the piston is blocked with respect to a displacement along the longitudinal axis, and a free-moving arrangement, in which the piston is released with respect to a displacement along the longitudinal axis.

12 Claims, 10 Drawing Sheets

SWITCHABLE DAMPER

CROSS-REFERENCES TO RELATED APPLICATIONS

This application claims the priority of German Patent Application, Serial No. 10 2016 207 809.7, filed May 4, 2016, pursuant to 35 U.S.C. 119(a)-(d), the content of which is incorporated herein by reference in its entirety as if fully set forth herein.

FIELD OF THE INVENTION

The invention concerns a switchable damper.

BACKGROUND OF THE INVENTION

Dampers, in particular friction dampers, are used today in innumerable systems, for example, to dampen movements in washing machines.

SUMMARY OF THE INVENTION

The invention is based on the task of producing a damper with improved functionality and which can be made and/or can be operated, in particular, in an uncomplicated manner The task is resolved by a switchable damper comprising a housing having a longitudinal axis, a plunger displaceable along the longitudinal axis, a piston arranged between the housing and the plunger, a friction lining arranged on the piston, a switching unit which is switchable between a blocking arrangement, in which the piston is blocked with respect to a displacement along the longitudinal axis, and a free-moving arrangement, in which the piston is released with respect to a displacement along the longitudinal axis.

The essence of the invention is a switchable damper having a switching unit which is switchable between a blocking arrangement and a free-moving arrangement. The switchable damper has a housing with a longitudinal axis, a plunger displaceable along the longitudinal axis and a piston arranged between the housing and the plunger. Furthermore, the switchable damper has a friction lining which is arranged on the piston. In the blocking arrangement, the piston is blocked with respect to a displacement along the longitudinal axis. The friction lining is blocked with the piston on which the friction lining is arranged. Displacement of the friction lining is blocked relative to the housing and/or to the plunger. In the blocking arrangement, the damping function of the switchable damper is activated, i.e. switched on. The free-moving function of the damper is deactivated, i.e. switched off When the damper is activated, that is, it is displaced relative to the housing, this results in friction damping. The switchable damper is suitable, for example, for use in washing machines. In the blocking arrangement, the drum of the washing machine can be switched before a critical speed is reached, in particular a resonance speed. An excessive movement can be prevented thereby, and, hence, the drum can be prevented from striking the housing of the washing machine. In the blocking arrangement, the switchable damper acts as a friction damper. In the free-moving arrangement, the friction lining is released with respect to a displacement relative to the housing and to the plunger. The free-moving arrangement is in particular advantageous during a spinning process at the maximum speed of the washing machine in order to avoid sustained damping. At the maximum speed, sustained damping can cause increased emissions of noise and vibrations. In the free-moving arrangement, the switchable damper acts as a free-moving damper. The construction and function of a free-moving damper of this type are known, for example, from EP 1 637 640 B1, to which reference is hereby made.

According to the invention, it was recognized that the switchable damper can be switched in an uncomplicated manner between the friction damping function in the blocking arrangement and the free-moving function in the free-moving arrangement. In particular, it is not necessary to produce a variable damper whose damping characteristic can be adjusted continuously. It is extremely expensive to produce a variable damper. A variable damper is costly. A switchable damper according to the invention is not complicated to produce or to manipulate. A switchable damper is cost effective. A switchable damper is not prone to failures and is sturdy. A switchable damper combines, in a particularly uncomplicated manner, the advantages of a friction damper with those of a free-moving damper.

The arrangement of the friction lining radially to the longitudinal axis, in particular between the plunger and the piston and/or between the piston and the housing, provides direct friction damping when there is an axial displacement of the plunger with respect to the housing. The friction lining can be arranged on an inner side and/or on an outer side of the piston. The piston is made, in particular, in the form of a sleeve and can have an inner and/or outer groove to accommodate the friction lining The friction lining is made, in particular, annular in shape and can have at least one projection on its front face.

A switching actuator to switch between the blocking arrangement and the free-moving arrangement guarantees the direct switching between the blocking arrangement and the free-moving arrangement. It has, in particular, a switching drive and an adjusting element.

The design of the adjusting element, which is arranged concentrically to the longitudinal axis, enables the switching movement of the adjusting element to be advantageous. The adjusting element can be rotated about the longitudinal axis to provide switching between the blocking arrangement and the free-moving arrangement. The adjusting element can be incorporated in the damper, advantageously taking up little space.

The design of the switching drive, which is designed as a switchable stroke magnet, is uncomplicated. In particular, the switchable stroke magnet facilitates a linear movement along the longitudinal axis of the damper, which is converted, in particular, into a rotary movement about the longitudinal axis by means of a force transmission element and a rotatable adjusting ring. In particular, the adjusting ring is connected solidly to the adjusting element of the switching drive with respect to rotation about the longitudinal axis.

The force transmission element, which is displaceable along a, in particular rigid, guide channel, can be designed flexible to provide a direct and uncomplicated conversion of the axial adjusting movement of the magnet into the rotary movement for the adjusting element.

A safety unit guarantees that the switching unit is activated, that is, switched on, even in an emergency situation, in particular if the electrical power supply fails. The safety unit has, in particular, at least one energy storage element and, in particular, a plurality of energy storage elements. A first energy storage element can be designed as a mechanical spring element and can be arranged, in particular, between the force transmission element and the adjusting ring. A second energy storage element can be designed as an electrical condenser and can be coupled with the stroke magnet.

In an alternative design the switching drive is provided as a switchable motor. The switchable motor is, in particular, an electric motor whose rotary axis is orientated parallel to the longitudinal axis of the damper. A torque transmission element in the form of a gear wheel or sprocket is arranged on the output shaft of the motor and is able, in particular, to engage in the corresponding outer teeth on the adjusting element. It is not necessary to convert the drive movement into the adjusting movement. The drive movement is transmitted directly to the adjusting element.

The switching drive is designed as a switchable rotary magnet. The adjusting element can be coupled directly to the rotary magnet. The rotary magnet is designed, in particular, as a plunger coil which is also known as a voice coil actuator. The rotary magnet comprises a coil on a support, made, in particular, of plastic, and a cylinder with at least one permanent magnet. The force and direction of the active, that is, displaced components are directly dependent on the direction and the strength of the electrical switching current through the coil according to the Lorentz force principle. The plunger coil can be designed with or without housing.

By designing the adjusting element, which is designed in the shape of a sleeve and has, in particular, at least one torque transmission element, the adjusting element can interact directly with the piston, in particular for the case in which the friction lining is arranged on the inner side of the piston.

By designing the damper, the switching is reliable and direct. For this, a shaped element and a mating shaped element are provided which can be made to engage for the blocking arrangement. The switchable damper is able to block the movement of the piston with the friction lining by creating a tight fit. The blocking arrangement can be realized in an uncomplicated manner. In the blocking arrangement, the shaped element is locked reliably on the mating shaped element.

By designing the shaped element and the mating shaped element, the blocking arrangement can be realized in an uncomplicated manner. The shaped gate can have a plurality of mating shaped elements wherein the shaped element, which is designed as a radial pin, can engage reliably in one of the mating shaped elements. Switching from the free-moving arrangement to the blocking arrangement is possible for different positions of the piston along the longitudinal axis in the damper.

Designing the damper in such way that the mating shaped element is arranged integrally on the piston, in particular on the outer side of the piston, facilitates the direct blocking of the piston. The mating shaped element is arranged integrally on the piston, in particular on the outer side of the piston. The mating shaped element can be designed as a raised structure, for example, as a shaped gate, or also as a depression or recess in the piston.

By designing the damper with the shaped element on the adjusting element, the switching of the damper is simplified. In particular, the shaped element is arranged on an inner side of the housing. Alternatively, it is possible when the mating shaped element is arranged on the inner side of the piston to provide the shaped element on an outer side of the adjusting element. In this case, the adjusting element is arranged between the plunger and the piston in a radial direction relative to the longitudinal axis of the damper.

A switchable damper comprising an impact damping unit, which has, in particular, at least one stop element projecting along the longitudinal axis and a damping element interacting with it, and/or an anti-rotation device for the piston has improved functionality.

Further advantageous embodiments, additional features and details of the invention will emerge from the following description of three design examples with the aid of the drawings.

DESCRIPTION OF THE PREFERRED EMBODIMENTS

Figure 1:
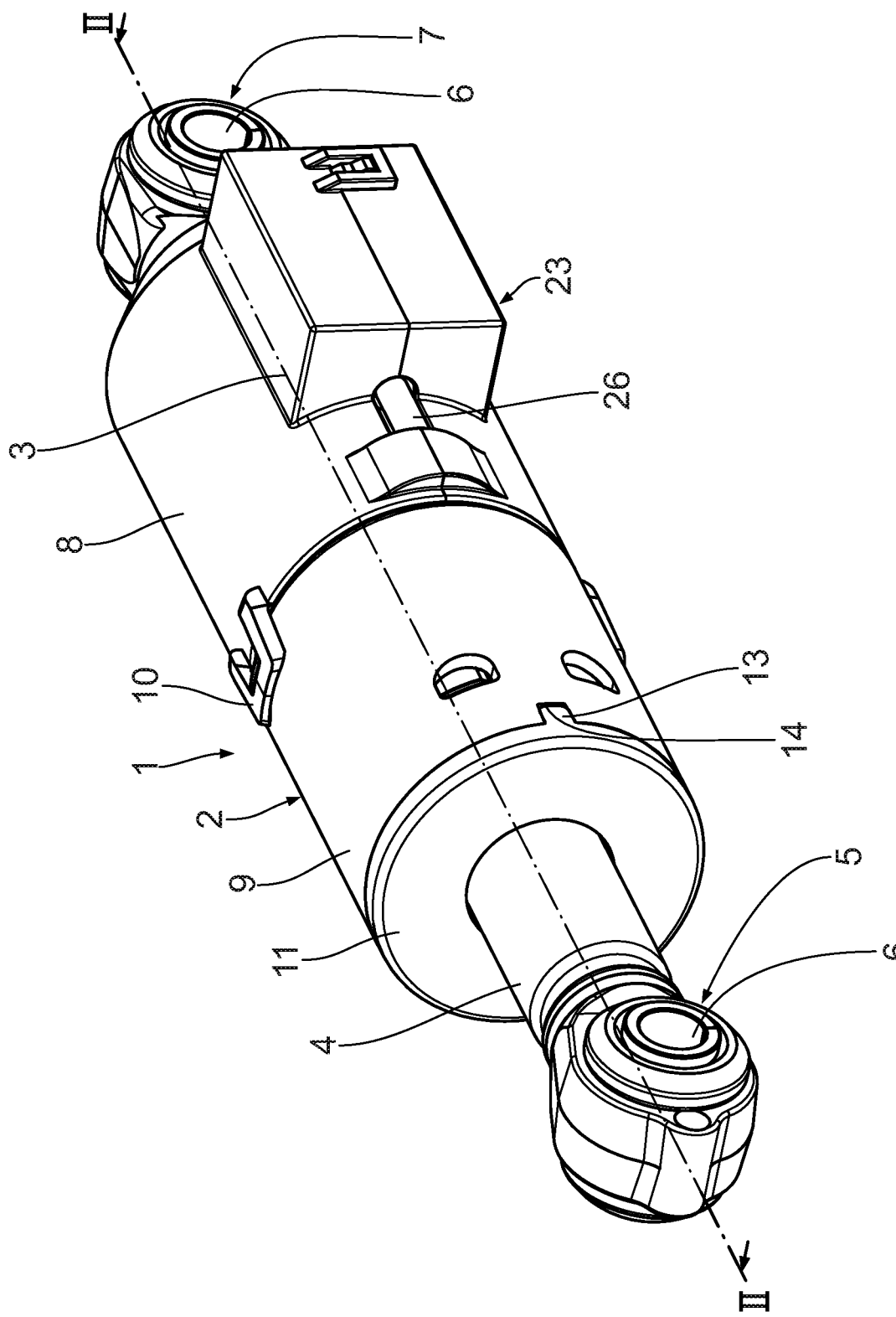
FIG. 1 shows a perspective illustration of a switchable damper according to the invention in a first embodiment example.

A switchable damper designated as 1 throughout in FIGS. 1 to 8 can be used in a washing machine to dampen an imbalance of the washing drum.

The damper 1 comprises a substantially cylindrical housing 2 with a longitudinal axis 3. A substantially tube-shaped plunger 4 is arranged concentric to the longitudinal axis 3, and can be displaced along the longitudinal axis 3 relative to the housing 2. The plunger 4 can also have a full cross section. The plunger 4 is arranged with a first end inside the housing 2 and with a second end leading out of the housing 2. On the second end away from the housing 2, the plunger 4 has a plunger fastening element 5. The plunger fastening element 5 has a through-sleeve 6 whose sleeve axis is orientated perpendicular to the longitudinal axis 3.

The housing has a housing fastening element 7 at one end of the damper 1 opposite the plunger fastening element 5, wherein said housing fastening element is designed to be substantially identical to the plunger fastening element 5 and has a sleeve 6. The plunger fastening element 5 is attached solidly to the plunger 4. The housing fastening element 7 is attached solidly to the housing 2. The housing fastening element 7 is fastened in particular to an end face of a guide section 19 of the housing 2.

The damper 1 is arranged with the fastening elements 5, 7 in the washing machine, in particular between its frame and the washing drum, in order to dampen a movement of the washing drum, in particular due to an imbalance during rotation, with respect to the frame.

Figure 2:
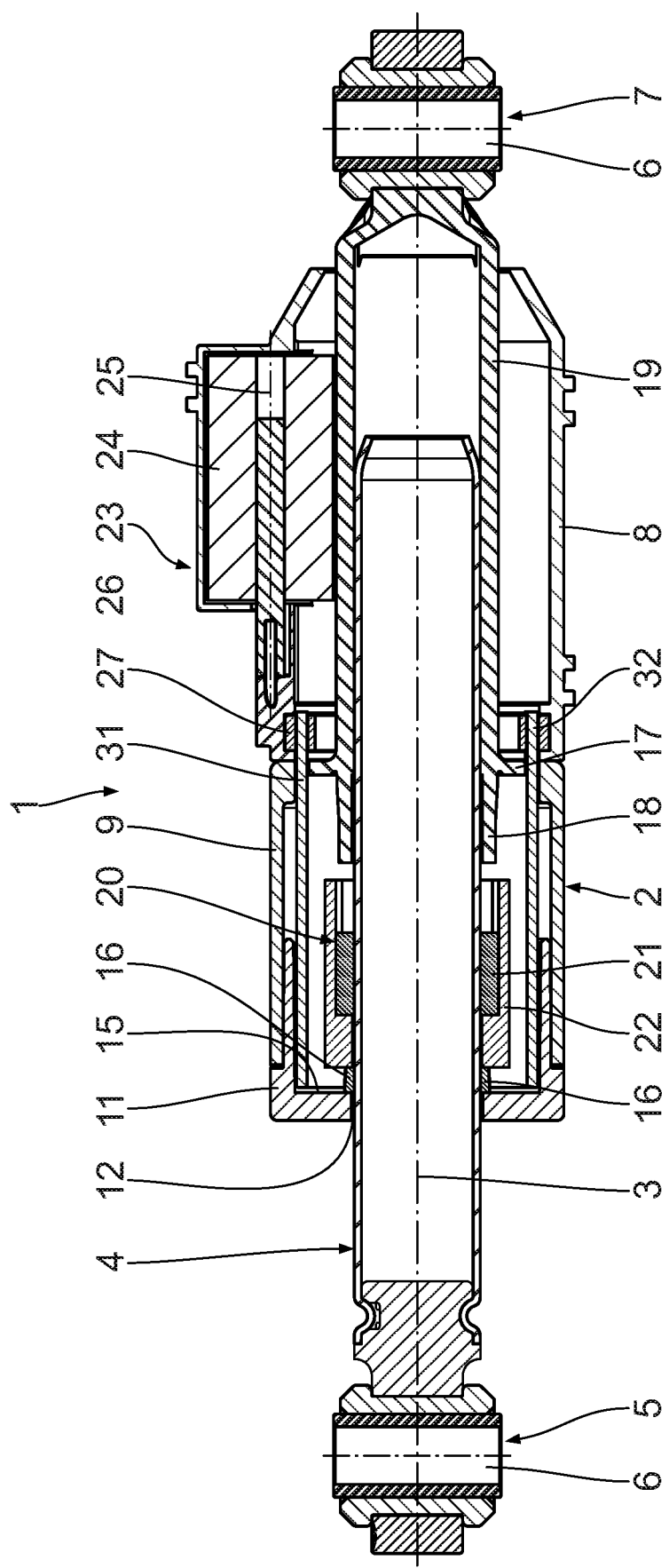
FIG. 2 shows a longitudinal section through section line II-II in FIG. 1.
Figure 4:
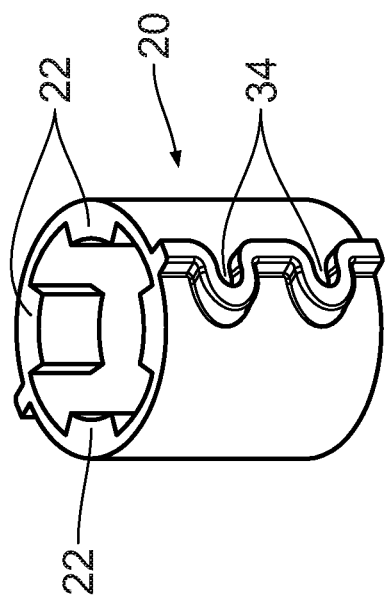
FIG. 4 shows a perspective illustration of the piston of the damper according to FIGS. 1 and 2.
Figure 3:
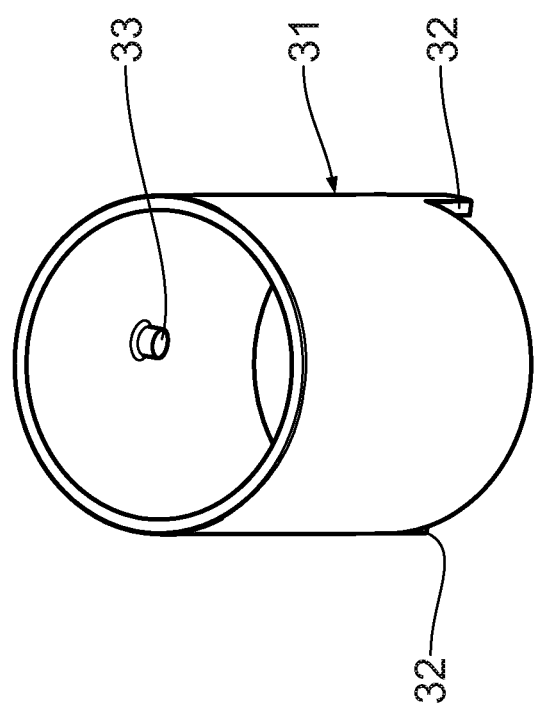
FIG. 3 shows a perspective illustration of the adjusting element of the damper in FIGS. 1 and 2.

The housing 2 is made in a plurality of parts and comprises a switching housing portion 8 shown on the right in FIG. 2 and a friction damping housing portion 9 attached detachably to it. The switching housing portion 8 and the friction damping housing portion 9 are arranged one behind the other along the longitudinal axis 3. The switching housing portion 8 is attached to the friction damping housing portion 9 at the end face away from the housing fastening element 7. The attachment can be implemented by snap-in elements 10 corresponding to each other.

The friction damping housing portion 9 is closed by means of a guide cap 11 on the end of the housing 2 towards the plunger fastening element 5. The guide cap 11 has a central guide opening 12, through which the plunger 4 is guided into an inner chamber of the housing 4. The guide cap 11 has at least one positioning tab 13 extending along the longitudinal axis 3, wherein said positioning tab engages in a recess 14 provided for it on the housing 2, in particular the friction damping housing portion 9. The positioning tab 13 enables the rotary position of the guide cap 11 to be established uniquely relative to the housing 2. The positioning tab 13 also serves to prevent the guide cap 11 from rotating about the longitudinal axis 3 relative to the housing 2.

Four cap free-running stops 16 are formed as one part on the guide cap 11 on an inner side of the end face 15. The cap free-running stops 16 are orientated parallel to the longitudinal axis 2 and are arranged in the shape of circular segments around the plunger 4 in a plane perpendicular to the longitudinal axis 3. The guide cap 11 is produced, in particular, from an elastic material, in particular from plastic. More or fewer than four cap free-running stops 16 can be provided. The cap free-running stops 16 are arranged spaced apart from each other in a tangential direction in relation to the longitudinal axis 3, in particular spaced apart equally. An open space is provided between two adjacent cap free-running stops 16.

A housing base 17 is formed as one part on the end face of the friction damping housing portion 9 opposite the guide cap 11. The housing base 17 is orientated perpendicular to the longitudinal axis 3. Four base free-running stops 18, for example, extend out from the housing base 17 towards the guide cap 11. Each of the base free-running stops 18 is orientated parallel to the longitudinal axis 3 and is designed to correspond with the cap free-running stops 16. The guide section 19 is formed as one part on the housing base 17 away from the base free-running stops 18. The guide section 19 serves to guide the plunger 4 when it is displaced axially inside the housing 2. The internal diameter of the guide section 19 corresponds substantially to the external geometry of the plunger 4. At the end opposite the plunger 4, the housing fastening element 7 is arranged on the guide section 19. The guide section 19 is guided through the switching housing portion 8 and the housing fastening element 7 projects beyond the rear end of the housing 2, shown on the right in FIGS. 1 and 2.

A piston 20 is arranged in the housing 2, in particular in the friction damping housing portion 9. The piston 20 is designed substantially as a hollow cylinder. The piston 20 can be displaced along the longitudinal axis 3 in the housing 2 and relative to the plunger 4. The piston 20 is arranged between the plunger 4 and the housing 2 in the radial direction of the longitudinal axis 3.

The piston 20 has an inner annular groove in which a friction lining 21 is arranged. The friction lining 21 is guided by the piston 20 where it is accommodated. A movement of the piston 20 along the longitudinal axis 3 causes the friction lining 21 to be displaced. The friction lining 21 is designed, in particular, as friction strips whose front faces can be made even or uneven, for example, jagged or wavy or in some other type of profile. The internal cylindrical friction surface of the annular friction lining 21 is in contact with an external side of the plunger 4. A relative movement between the plunger 4 and the friction lining 21 results in a frictional force acting against the movement, in other words it causes frictional damping.

The internal groove of the piston 20 is delimited on both sides in the axial direction by guide ribs 22. The guide ribs 22 are designed integrally with the piston 20. The guide ribs 22, with respect to the internal groove, project radially inwards relative to the longitudinal axis 3. The guide ribs 22 are each made in the shape of annular segments in a plane perpendicular to the longitudinal axis 3. The internal contour defined by the guide ribs 22 corresponds substantially to the external contour of the plunger 4, wherein the internal contour in the area of the guide ribs 22 is larger than the external contour of the plunger 4 to the extent that it is not possible for the piston 20 to come into direct contact with the plunger 4.

Four guide ribs 22 are provided respectively at the end faces of the piston 20. Regarding their tangential extension, the guide ribs 22 are designed around the longitudinal axis 3 such that they can engage in the intermediate spaces between the longitudinal cap ribs 16 or, respectively, in the intermediate spaces between the longitudinal base ribs 18. According the illustration of the damper in FIG. 2, the piston 20 is arranged adjacent to the guide cap 11. The guide ribs 22 which face the guide cap 11, engage in the intermediate spaces between adjacent longitudinal cap ribs 16. As a result, the piston 20 cannot rotate relative to the housing 2 unintentionally. Regarding their tangential position, the four longitudinal cap ribs 16 are arranged so that they are rotated through 45° relative to the longitudinal base ribs 18. The friction lining 21 in the piston 20 is located free to move in the axial direction of the longitudinal axis 3 at least locally through the intermediate spaces between two guide ribs 22. This area where the friction lining 21 is free to move can be restricted by the end faces of longitudinal cap ribs 16 or longitudinal base ribs 18. The friction lining 21 serves as a stop buffer.

The damper 1 also has a switching unit 23 which enables switching between a blocking arrangement and a free-moving arrangement of the piston 20. The switching unit 23 comprises a switching actuator 28 with a switching drive 24. According to the design example shown, the switching drive 24 is designed as a stroke magnet which causes a linear stroke movement and is triggered by electrical switching.

Figure 6:
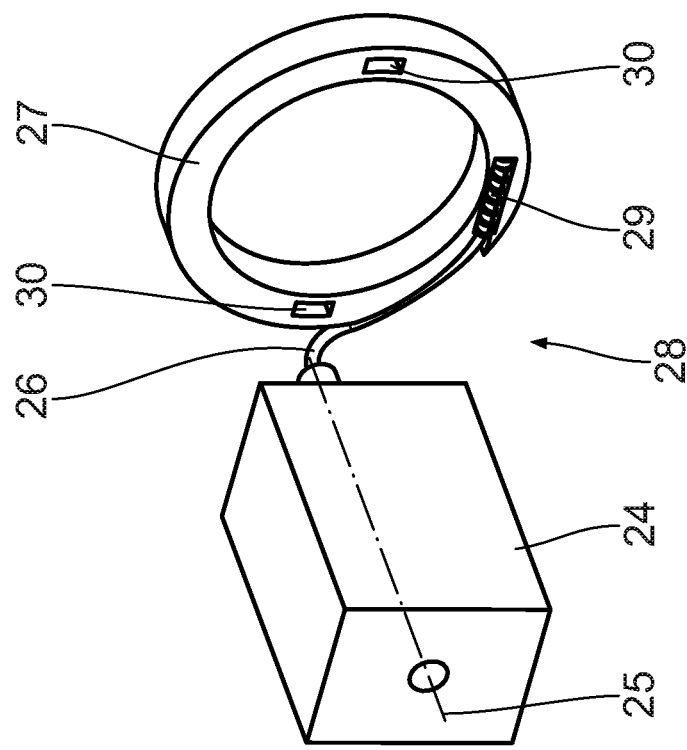
FIG. 6 shows a perspective illustration of a switching actuator of the damper according to FIGS. 1 and 2.
Figure 5:
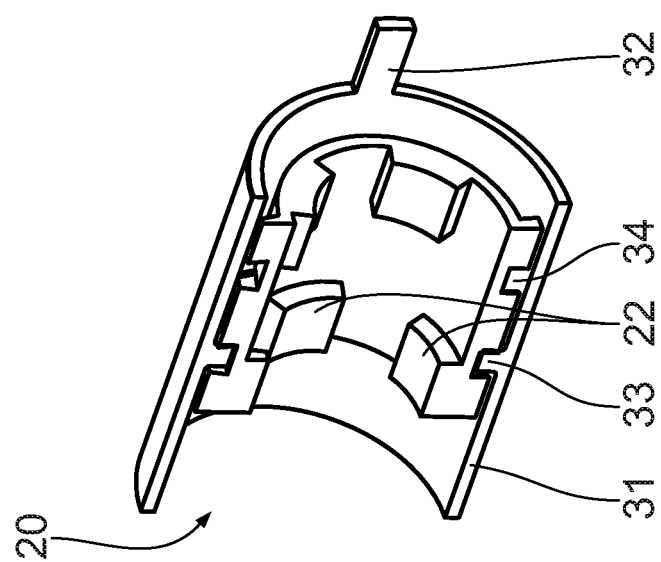
FIG. 5 shows a perspective illustration of a partial section of the piston and of the adjusting element in a blocking arrangement.

The stroke magnet is fitted on the housing 2 of the damper 1 such that the linear stroke axis 25 is orientated parallel to the longitudinal axis 3 of the damper. In the area of the switching housing portion 8, in which the stroke magnet is arranged, the housing 2 is non-round, that is, it is designed so that it deviates from a cylindrical shape. The stroke magnet is connected to an adjusting ring 27 by means of a force transmission element 26. The switching drive 24 as a switchable stroke magnet, the force transmission element 26 and the adjusting ring 27 form the switching actuator 28, which is illustrated in FIG. 6. The force transmission element 26 is designed as a flexible wire which is guided, in particular, along a rigid guide channel The force transmission element engages, in particular, substantially radially with the adjusting ring 27 and can be displaced there against a spring force provided by an energy storage element in the form of a spring element 29. The adjusting ring 27 has two openings 30, arranged eccentrically to the longitudinal axis 3, in which a sleeve-shaped adjusting element 31 with engagement tab on the face 32 engages. The adjusting element 31 is a component part of the switching unit 23. The switching unit 23, in particular in the form of the adjusting element 31, enables a positive connection to be made with the piston 20 in the blocking arrangement and the piston 20 to be released in the free-moving arrangement. For this, the adjusting element 31 has a radial pin as a shaped element 33 on an inner side of the inner cylinder cover face which can engage with a mating shaped element 32 on a shaped gate. The mating shaped elements 32 are formed integrally on an outer side of the substantially cylindrically designed piston 20. According to the design example shown, two shaped gates are provided on the piston 20 wherein each shaped gate has two mating shaped elements 34. The mating shaped elements 34 are each designed to be substantially U-shaped wherein the parallel legs of the U extend in a circumferential direction about the longitudinal axis 3 in the installed condition of the piston 20. The shaped gates are arranged diametrically opposite on the outer side of the piston 20 relative to the longitudinal axis 3. Each opening of the U is orientated in a circumferential direction about the longitudinal axis 3.

Figure 7:
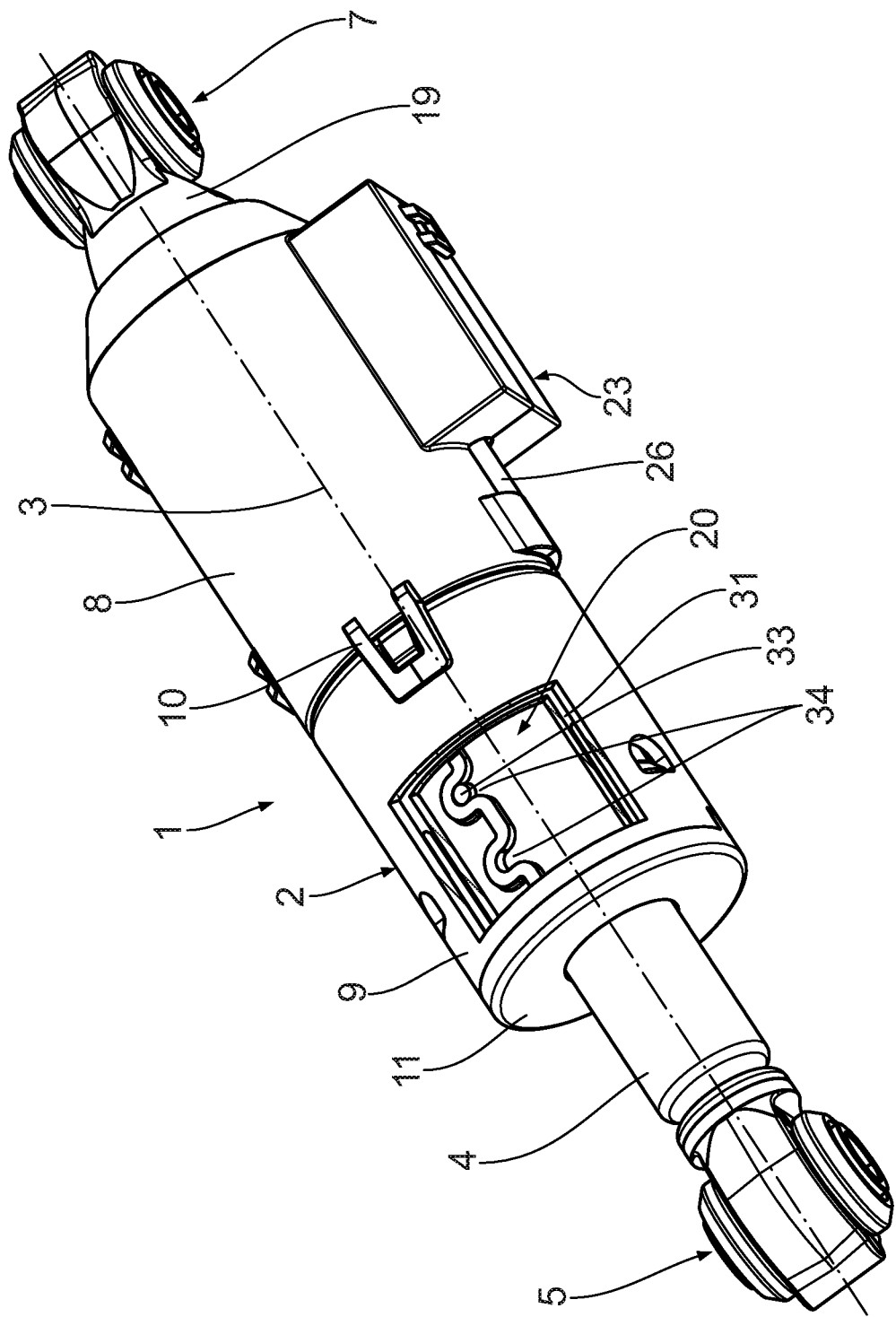
FIG. 7 shows a perspective illustration of a partially cutaway section of the damper according to FIG. 1 in the blocking arrangement.

The function of the friction damper 1 is explained in more detail below. According to the arrangement of the adjusting element 31, as shown in FIG. 7, the damper 1 is positioned in the blocking arrangement. In the blocking arrangement, the shaped element 33 is located in one of the mating shaped elements 34. The parallel legs of the U of the mating shaped elements 34 form an undercut in a direction parallel to the longitudinal axis 3. A displacement of the piston 20 relative to the housing 2 and/or to the plunger 4 is blocked. A displacement of the plunger 4 relative to the housing 2 causes a friction force on the plunger 4 due to the friction lining 21 bearing on it radially and blocking it axially. In this arrangement, the friction damping function of the damper 1 is switched on, that is, activated.

Figure 8:
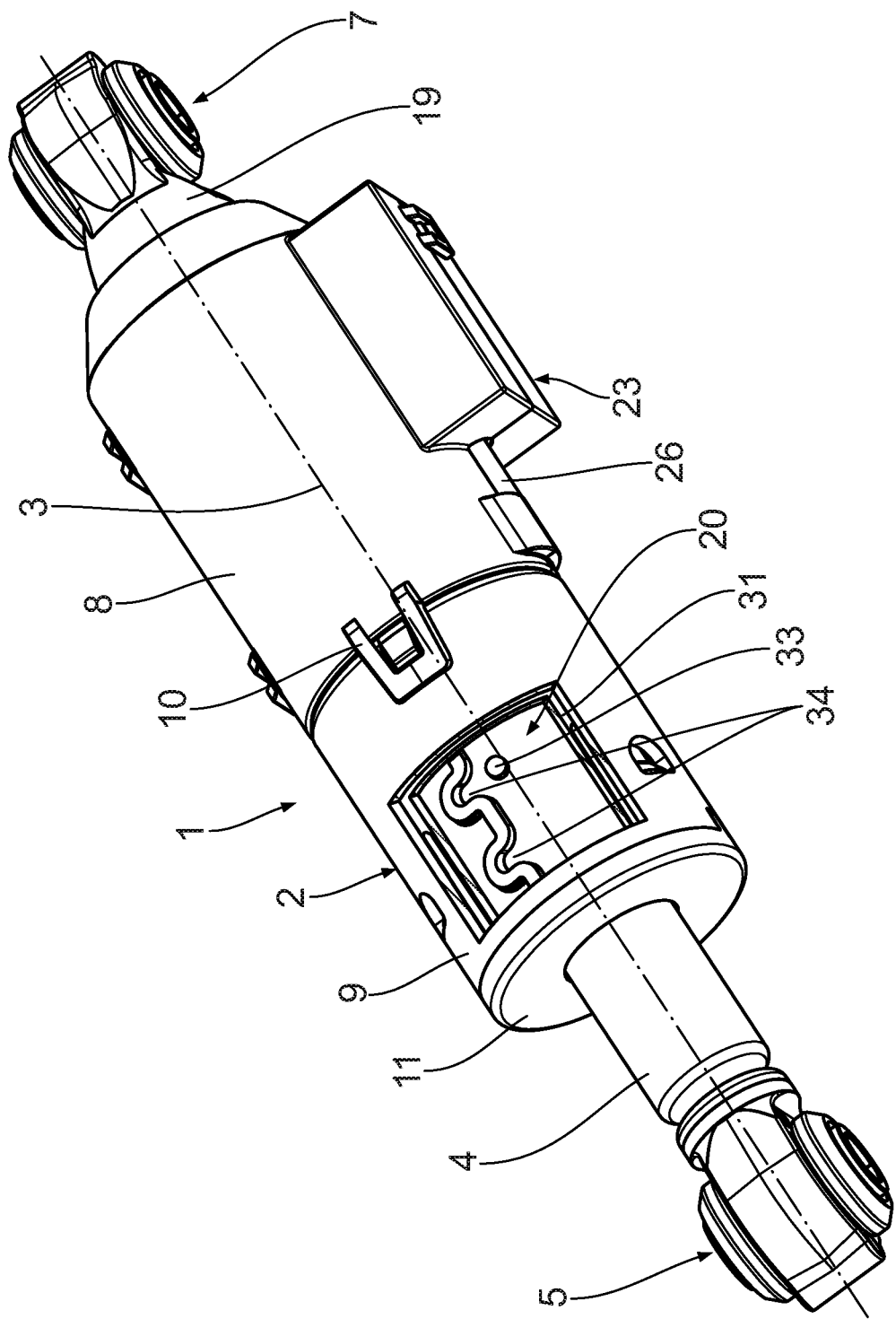
FIG. 8 shows an illustration according to FIG. 7 of the damper in the free-moving state.

In order to switch the damper 1 over to the free-moving arrangement, the switching unit 23 is activated by operating the switching actuator 28. By switching on the stroke magnet 24, the force transmission element 26 which engages with the stroke magnet 24 is displaced along the stroke axis 25. The force transmission element 26 is driven radially along the curved guide channel to the adjusting ring 27. The force transmission element 26 exerts a torque on the adjusting ring 27 about the longitudinal axis 3 and causes the adjusting ring 27 to rotate about the longitudinal axis 3. Together with the adjusting ring 27, the adjusting element 31 is rotated which is retained with the engagement tabs 32 in the openings 30 of the adjusting ring 27. Due to the rotation of the adjusting element 31, the shaped element 33 is rotated relative to the piston 20, the plunger 4 and the housing 2 about the longitudinal axis 3. The shaped element 33 is displaced out of the mating shaped element 34. The free-moving arrangement of the damper is shown in FIG. 8. In the free-moving arrangement of the mating shaped element 34, the shaped element 33 is arranged offset in a circumferential direction, that is, in a tangential direction, with respect to the longitudinal axis 3. The piston 20 is released by the adjusting element 31. In the free-moving arrangement, the piston 20 can be displaced along the longitudinal axis 3 relative to the housing 2 and relative to the plunger 4.

In order to transfer the damper 1 back to the blocking arrangement, the stroke magnet 24 is switched in the correspondingly opposite direction, thereby rotating the adjusting element 31 in the opposite direction about the longitudinal axis 3.

The spring element 29 is a part of a safety device which enables the switching unit 23 to be switched again in the event of a power failure. For this, a condenser (not shown) is provided which can store electrical energy which is sufficient to switch the stroke magnet 24 if the power supply is interrupted. The movement of the stroke magnet 24 is stored mechanically in the spring element 29.

Both mating shaped elements 34 of a shaped gate are arranged with a gap between each other along the longitudinal axis 3. It is possible, thereby, that the piston 20 can be blocked in different positions by means of the adjusting element 31 and its shaped element 33 along the longitudinal axis 3. In particular, lead-in chamfers can be provided on the mating shaped element 34 along the rotary direction of the adjusting element 31 to make it easier to guide the shaped element 33 into the mating shaped element 34 if the positioning of the shaped element 33 in relation to the mating shaped element 34 is imprecise, that is, if the positioning does not line up precisely.

Other embodiments for the shaped element 33 and the mating shaped element 34 are conceivable. According to a design (not shown), the shaped element can be designed in the shape, for example, of a wedge which, by means of its wedge tip, is able to engage by locking into a plurality of, in particular many, sharp recesses made on a shaped gate corresponding to the wedge tip. In particular at least five, in particular at least 10 and in particular at least 20 corresponding recesses, into which the wedge tip can engage, can be provided on the shaped gate. It is possible, thereby, that the shaped element can engage in one of the mating shaped elements substantially independently of the axial positioning of the piston 20.

The friction lining 21 can also be arranged on an outer side of the piston 20. In this case, the mating shaped element is positioned on an inner side of the piston 20. The shaped element would then be arranged between the plunger 4 and the piston 20.

Figure 9:
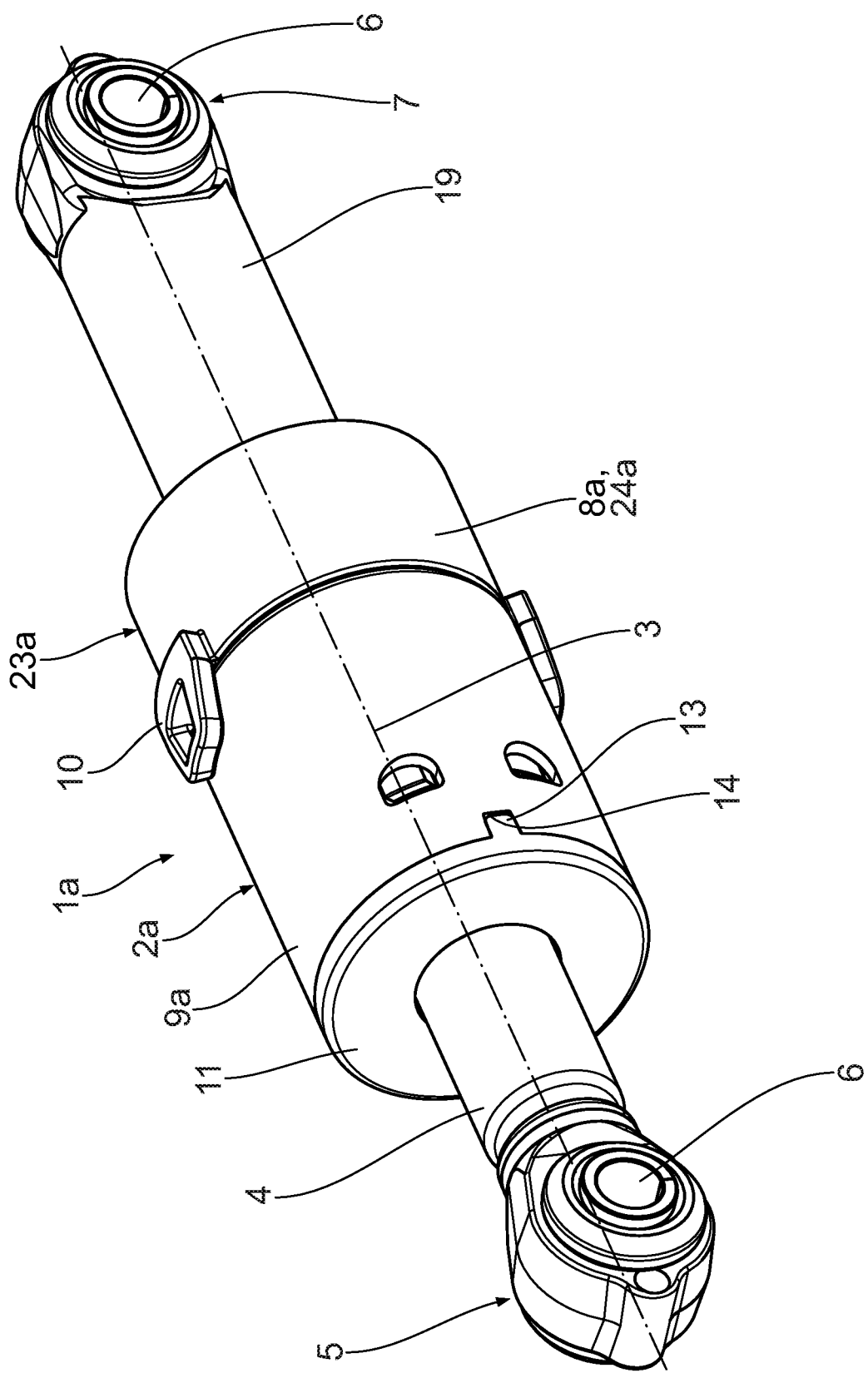
FIG. 9 shows an illustration according to FIG. 1 of a damper according to a second design example.
Figure 10:
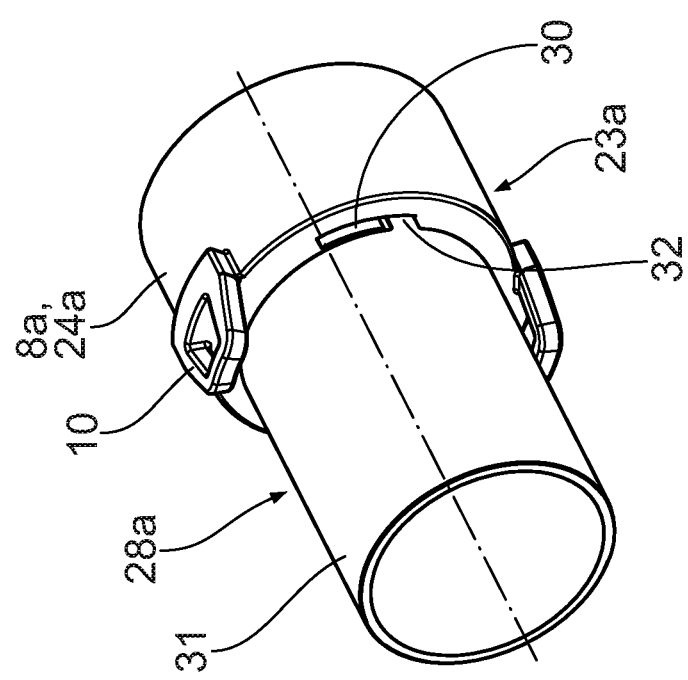
FIG. 10 shows a perspective illustration of the switching actuator of the damper according to FIG. 9.

Below, and referring to FIGS. 9 and 10, a second design example of the invention is described. Structurally identical parts have the same reference symbols as in the first design example, whose description is hereby referred to. Structurally different though functionally identical parts have the same reference symbols with an 'a' placed after.

The essential difference compared with the first design example consists in the embodiment of the switching unit 23a. The switching unit 23a, in particular the switching actuator 28a, has, as a switching drive 24a, a switchable rotary magnet, which is also known as a plunger coil or voice coil. The rotary magnet enables an active component to rotate relative to a static, passive component. The active component of the rotary magnet is coupled in a torque-proof manner by means of the engagement tabs 32 of the adjusting element 31 by the method described above. In order that the rotary magnet 24a is arranged concentrically to the longitudinal axis 3, the housing 2a, in particular the switching housing portion 8a, is designed substantially as a cylinder. The structural size of the housing 2a, in particular the length of the housing along the longitudinal axis 3 of the switching housing portion 8a, is reduced. The damper 1a is structurally particularly compact.

Figure 11:
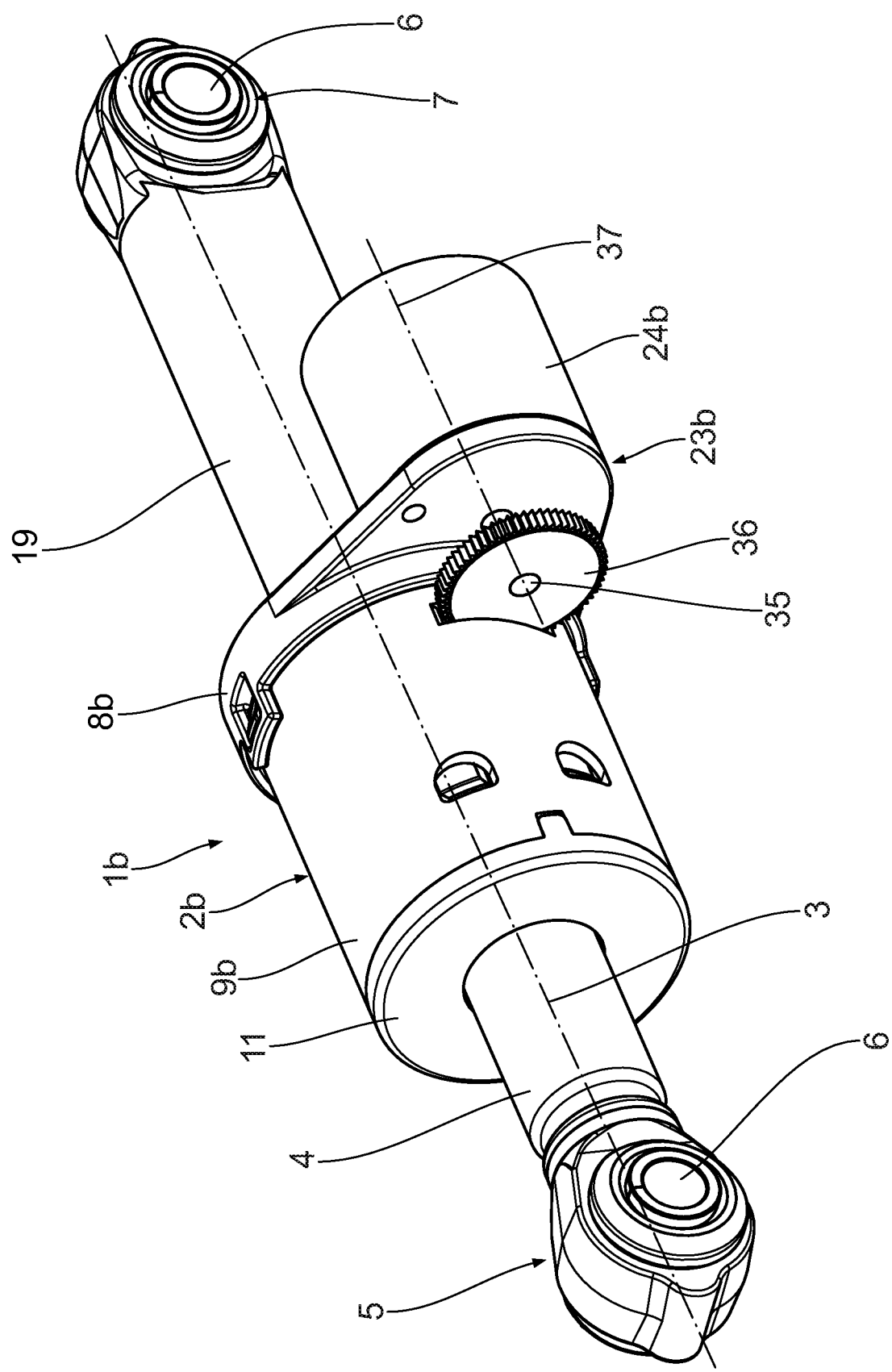
FIG. 11 shows an illustration according to FIG. 1 of a damper according to a third design example and FIG. 12 shows a perspective illustration of the switching actuator of the damper in FIG. 11.
Figure 12:
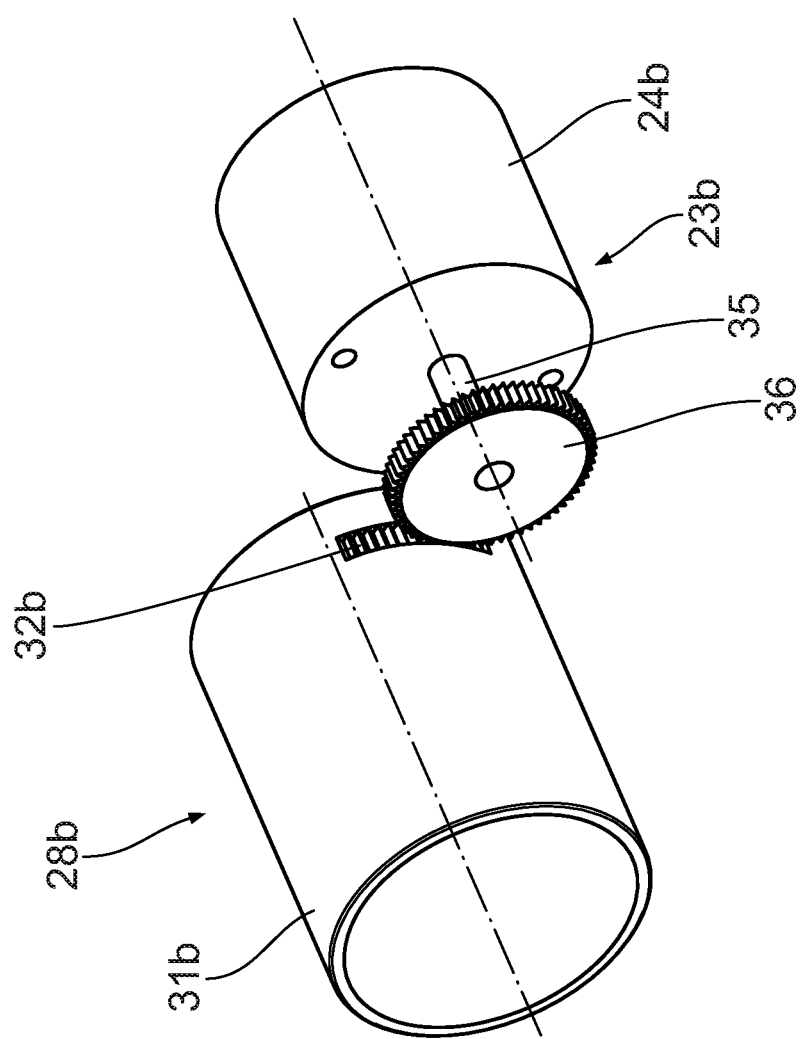

Below, and referring to FIGS. 11 and 12, a third design example of the invention is described. Structurally identical parts have the same reference symbols as in the first two design examples, whose description is hereby referred to.

Structurally different though functionally identical parts have the same reference symbols with a 'b' placed after.

The essential difference compared with the previous design examples consists, in the case of the damper 1b, in the embodiment of the switching unit 23b, which has a switchable motor, in the form, for example, of an electric motor, as a switching drive 24b. A gear wheel 36 is provided on the output shaft 35 of the electric motor 23b. The electric motor 24b is arranged on the housing 2b of the damper 1b such that the rotary axis 37 of the electric motor 24b is arranged parallel to the longitudinal axis 3 and offset from the longitudinal axis 3. The gear wheel 36 engages with its external teeth in corresponding external teeth 32b on the adjusting element 31b. The external teeth 32b correspond to the engagement tabs on the adjusting elements according to the previous design examples. The engagement tabs 32 and the external teeth 32b also serve as torque transmitting means to transfer the switching torque produced by the switching actuator 28, 28a, 28b to the sleeve-shaped adjusting element 31, 31b and to make the adjusting element 31, 31b rotate about the longitudinal axis 3 of the housing 2.

What is claimed is:

1. A switchable damper comprising:
    a housing having a longitudinal axis;
    a plunger displaceable along the longitudinal axis;
    a piston arranged between the housing and the plunger;
    a friction lining arranged on the piston; and
    a switching unit which is switchable between a blocking arrangement, in which the piston is blocked with respect to a displacement along the longitudinal axis, and a free-moving arrangement, in which the piston is released with respect to a displacement along the longitudinal axis, the switching unit having a switching actuator to switch between the blocking arrangement and the free-moving arrangement, wherein the switching actuator comprises a switching drive designed as a switchable stroke magnet.

2. A switchable damper according to claim 1, wherein said switchable stroke magnet is connected by means of a force transmission element to a rotatable adjusting ring.

3. A switchable damper according to claim 1, wherein the force transmission element is designed to be flexible.

4. A switchable damper according to claim 3, wherein the switching unit has a safety unit.

5. A switchable damper according to claim 4, wherein the safety unit comprises power storage elements.

6. A switchable damper according to claim 4, wherein the power storage elements are configured as at least one of a spring element arranged between the force transmission element and the adjusting ring and a condenser in the stroke magnet.

7. A switchable damper according to claim 1, wherein the adjusting element has the shape of a sleeve.

8. A switchable damper according to claim 7, wherein the adjusting element has at least one torque transmission element.

9. A switchable damper comprising:
    a housing having a longitudinal axis;
    a plunger displaceable along the longitudinal axis;
    a piston arranged between the housing and the plunger;
    a friction lining arranged on the piston; and
    a switching unit which is switchable between a blocking arrangement, in which the piston is blocked with respect to a displacement along the longitudinal axis, and a free-moving arrangement, in which the piston is released with respect to a displacement along the longitudinal axis, the switching unit having a shaped element which is engageable with a mating shaped element in the blocking arrangement, wherein the shaped element is a radial pin which is engageable in the mating shaped element designed as a shaped gate, wherein the mating shaped element is arranged on the piston.

10. A switchable damper according to claim 9, wherein the switching unit comprises a switching drive comprising a switchable electric motor, wherein the adjusting element is driveable by means of a gear wheel.

11. A switchable damper according to claim 9, wherein the switching unit comprises a switching drive comprising a switchable rotary magnet, wherein the adjusting element is coupled directly to the rotary magnet.

12. A switchable damper comprising:
    a housing having a longitudinal axis;
    a plunger displaceable along the longitudinal axis;
    a piston arranged between the housing and the plunger;
    a friction lining arranged on the piston;
    a switching unit which is switchable between a blocking arrangement, in which the piston is blocked with respect to a displacement along the longitudinal axis, and a free-moving arrangement, in which the piston is released with respect to a displacement along the longitudinal axis, the switching unit having a shaped element which is engageable with a mating shaped element in the blocking arrangement, wherein the shaped element is a radial pin which is engageable in the mating shaped element designed as a shaped gate, wherein the shaped element is arranged on the adjusting element.

* * * * *